(12) United States Patent
Kovacevic (10) Patent No.: US 10,838,686 B2
(45) Date of Patent: Nov. 17, 2020

(54) ARTIFICIAL INTELLIGENCE TO ENHANCE A LISTENING EXPERIENCE

(71) Applicant: Josh Kovacevic, West Jordan, UT (US)

(72) Inventor: Josh Kovacevic, West Jordan, UT (US)

(*) Notice: Subject to any disclaimer, the term of this patent is extended or adjusted under 35 U.S.C. 154(b) by 147 days.

(21) Appl. No.: 16/034,927

(22) Filed: Jul. 13, 2018

(65) Prior Publication Data

US 2019/0196777 A1    Jun. 27, 2019

Related U.S. Application Data

(60) Provisional application No. 62/531,878, filed on Jul. 13, 2017.

(51) Int. Cl.
| | |
|---|---|
| *G06F 3/16* | (2006.01) |
| *G06F 16/635* | (2019.01) |
| *G06F 16/65* | (2019.01) |
| *G06F 3/0482* | (2013.01) |
| *H04R 5/033* | (2006.01) |
| *H04R 5/04* | (2006.01) |
| *H04R 1/10* | (2006.01) |

(52) U.S. Cl.
CPC ............ *G06F 3/165* (2013.01); *G06F 3/0482* (2013.01); *G06F 16/637* (2019.01); *G06F 16/65* (2019.01); *H04R 5/033* (2013.01); *H04R 5/04* (2013.01); *H04R 1/1016* (2013.01); *H04R 2420/07* (2013.01); *H04R 2430/01* (2013.01)

(58) Field of Classification Search
CPC ...................................... G06F 16/64
USPC ...................................... 704/270
See application file for complete search history.

(56) References Cited

U.S. PATENT DOCUMENTS

| | | | | |
|---|---|---|---|---|
| 2010/0250471 | A1* | 9/2010 | Alcalde | G06Q 30/0603 706/11 |
| 2015/0277849 | A1* | 10/2015 | Beaumier | G06F 3/162 715/716 |
| 2016/0104486 | A1* | 4/2016 | Penilla | B60R 16/0373 704/232 |

* cited by examiner

*Primary Examiner* — Huyen X Vo
*Assistant Examiner* — Timothy Nguyen
(74) *Attorney, Agent, or Firm* — Amy Fiene PC (57) ABSTRACT

An earbud system and method adaptively acquires and classifies one or more data sets to provide a custom audio listening experience.

18 Claims, 13 Drawing Sheets

FIG. 13

ARTIFICIAL INTELLIGENCE TO ENHANCE A LISTENING EXPERIENCE

BACKGROUND

Wireless earbuds are a game-changing addition to the space of electronics. They enable an ease of listening to music using a simple component that fits into a user's ear. Users are free to move from location to location unhindered by cables or other components. Also, users may listen to all types of music using controls located on their mobile devices, controls on the earbuds themselves, or even voice commands.

Even with all of the advantages that earbuds provide, the ultimate performance of earbuds still depends largely on sound quality. Therefore, a growing need exists for improvements to earbuds to enhance aspects related to sound and the listening experience therein.

SUMMARY

An exemplary audio customization system includes a data input module that includes a computing device and computer-readable instructions to direct the computing device to receive customization data and provide customization to a customization rule module. The customization rule module includes a computing device and computer readable instructions that direct the computing device to apply an artificial intelligence algorithm to the customization data to generate a customization rule set based on the customization data.

One form of the system may include an earbud system and a mobile application or other computing system that adaptively acquires and classifies one or more data sets to provide a custom audio listening experience.

A method of managing an audio customization system, e.g., output to earbuds, includes steps of generating a data set by determining a pattern of listening. This is accomplished by measuring input of one or more physiological responses of a user, such as ambient sound, ambient light, music currently being played, active choices by a user, active responses of a user, etc. The input is combined with preset data about one or more music and user preferences and a pattern is determined. Based on the pattern, an action, customized to a particular user, is performed to enhance a listening experience.

DETAILED DESCRIPTION

The following discloses a computer-implemented system that uses artificial intelligence ("AI") to enable a smart, or custom, listening experience, for an end user. A custom listening experience may include, for instance, a sound which compensates for low levels of hearing for a given user. Every person has a unique hearing profile and a custom listening experience can overcome the low levels by adjusting various frequencies, volume, and other sound features related thereto to provide a normalized or customized listening experience.

Additionally, a listening experience for a base song can be enhanced by applying characteristics of a set of other songs, e.g., songs of a particular style. For example, a particular note may occur in the base song with a certain frequency. In a set of songs of a particular style, a different note may be played with the same or similar frequency. The note in the base song may be replaced by the note from a set of style songs. Replacing the note in the base song with a note of similar frequency from a set of style songs may transform, in whole or in part, the genre of the base song. For example, if the set of style songs comprises country songs, but the base song comprises a rap song, replacing one or more notes from the base rap song with the identified note or notes from the set of country style songs enables songs to be played in a manner that is more characteristic of songs from a desired genre. For example, a country song can take on characteristics of a rock song. Alternatively, the country song can take on characteristics of a new country song or a country song played like it was made 50 years ago. Other characteristics that can change include frequency, bass, tempo, acoustics, pitch, timbre, beat, or other characteristics.

Tones that are used toward specific categories of music may be emphasized for a given user depending on user music preference type. This can be an option by music choice, equalizer sound test, and/or may be automatically adjusted via artificial intelligence. In an example, for a user that prefers flute melodies, flute melodies in certain types of music for that user could be elevated in sound.

The experience can further be made smart by accounting for a given external environment. For example, if a visitor starts a conversation with a user, the earbud may sense the conversation and pause or lower the volume of the current music playing.

In another variation, the custom listening experience may be restricted by parental controls. This allows parents to mute profane language, tweak the bass levels to a desirable level, restrict times of day, or have many other control rights. In another example, the experience may be subject to a doctor's prescription to restrict certain frequencies or decibel levels, high bass, and instruments, etc., to prevent hearing loss. Other smart features are described herein.

The description references earbuds for auditory benefits, however the AI techniques described herein apply to many different sound devices, including, for example, headphones, hearing aids, stereo speakers, computer speakers, other types of speakers, electronic devices, mobile phones and accessories, tablets, and other devices that include speakers. An exemplary sound is provided through the earbud, such as a wireless earbud, which is communicatively coupled with a mobile phone or to the earbud itself. The sound may be controlled by the app on the mobile phone or an app on the earbud. While the system is described as being implemented with an application ("app") on a mobile phone, it may instead be a program on a computer, on the earbud itself, or other electronic devices known in the art, such as a smart watch, tablet, computing device, laptop, and other electronic device.

Platforms for the system may further include hardware, a browser, an application, software frameworks, cloud computing, a virtual machine, a virtualized version of a complete system, including virtualized hardware, OS, software, storage, and other platforms. The connection may be established using Bluetooth or other connectivity.

While various portions of the disclosed systems and methods may include or comprise AI, other types of machine learning, or knowledge or rule-based components, sub-components, processes, means, methodologies, or mechanisms (e.g., support vector machines, neural networks, expert systems, Bayesian belief networks, fuzzy logic, data fusion engines, classifiers, etc.) are anticipated. Such components, inter alia, can automate certain mechanisms or processes performed thereby to make portions of the systems and methods more adaptive as well as efficient and intelligent.

In collecting information, the program may collect information about a user and the previous user control and preferences. For example, preferred music type, volume control, and listening habits, and other information is collected. Data analytics and other techniques are applied to then guess what the user will want during upcoming listening experiences. The AI program can also act in real-time to customize the user experience as the user is listening and using controls. In essence, it can work as a personal custom deejay.

The AI program can also be incorporated with or work in conjunction with other applications, such as an equalization app that auto-customizes sound using a sound test, controls, and/or other methods.

Based on user response and how the individual hears specific tones and music frequencies, the data will then be used to adjust how the music is streamed or played on the device according to the user's response. This allows for the device's battery life to be preserved and will extend the length of playback time that is possible. Additionally, playback may respond according to the habits of the user for preferences of listening to certain genres of music, specific music artists, and/or ambient noise that's recognized through the physical location of the user at any given time. Data of this sort is collected and used to auto adjust the sound controls for music playback. In essence, the AI technology acts as a personal deejay for each user, but one that takes into account personal hearing specs as well as personal preferences in listening to music. This is a differentiating factor and functionality from that of the current music industry.

AI can also be utilized in the app interface customizing a landing page user experience as well. Populating tools and user page may be customized depending on the user actions.

For example, a user that prefers rock music will auto populate information and music selections around rock and present them on the user page.

AI can populate tunes depending on user preferences. This can save battery life by adding or taking away non-needed tunes.

AI can auto adjust the sound equalizer to user preference. This can also be adjusted by the user as well as a starting base point and then changed from there.

AI may be implemented into an app to change and auto adjust to the user experience depending on user actions and preferences. This can relate to equalizer function, sound experience, app function, volume control, language control, playlist recommendation, speaker control, battery saver, auto adjustment of sound to a type of music, and/or muting through app.

Features may additionally include the ability for the user to have a pre-set option which can be turned on and off at any time but varies from the traditional functionality of AI in the sense that the data collected for the following features will actually be saved and remembered so that the user can quickly enable or disable the feature sets.

Included in the pre-set option or other features herein is an ad blocker feature. This feature would allow the user to choose whether or not the volume gets muted for an advertisement. If activated, the ad blocker feature would automatically lower and/or mute the playback volume during the portion of time that the app recognizes that an advertisement is being played. Note that master controls may embed the streaming of music and this allows the user to quickly override any preset features that have been enabled by simply pushing up or down on the device's volume controls.

Figure 1:
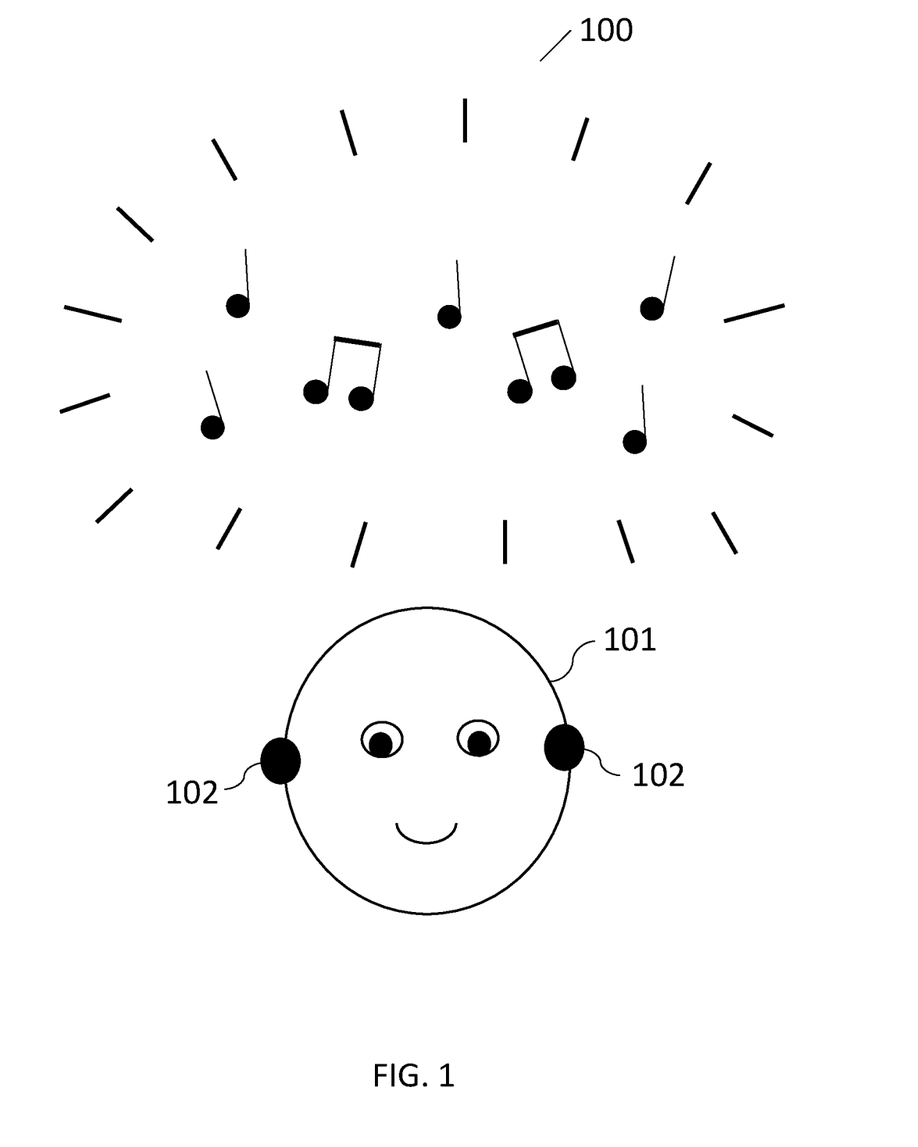
FIG. 1 illustrates a pair of earbuds enhanced by a smart listening experience.

Turning to FIG. 1, a user 101 is shown listening to music with earbuds 102 and having a custom listening experience that is enhanced by an AI program as indicated by highlighting lines that frame music notes. An exemplary AI program is used to change the sound to auto customize a user's music experience.

An exemplary process of changing sound involves the equalization of earbuds. Equalization is the process of adjusting the balance between frequency components within an electronic signal. Exemplary equalization or other processing for audio listening includes control for left-right balance, voice, frequency, treble, bass, noise cancellation, sound feature reduction and/or amplification (e.g., tones, octaves, voice, sound effects, etc.), common audio presets (e.g., music enhancements, reduction of common music annoyances), decibel, pitch, timbre, quality, resonance, strength, etc. Equalization makes it possible to eliminate unwanted sounds or make certain instruments or voices more prominent. With equalization, the timbre of individual instruments and voices can have their frequency content adjusted and individual instruments can be made to fit the overall frequency spectrum of an audio mix.

Figure 2A:
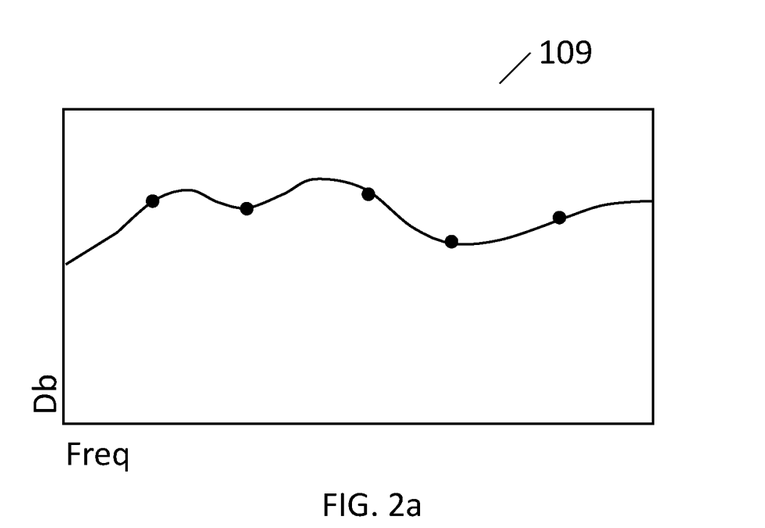
FIG. 2a illustrates an exemplary graphical representation of hearing levels as determined by a sound test.
Figure 2B:
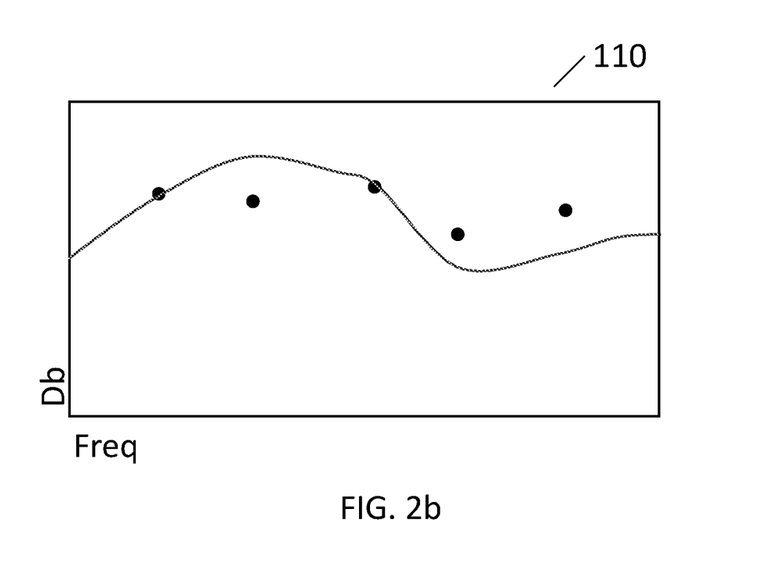
FIG. 2b illustrates an exemplary graphical representation of hearing levels as determined by a sound test and a modification to the hearing levels.

FIGS. 2a and 2b illustrate the exemplary process of equalization. FIG. 2a shows a sound test graph 109 with a curved line and reference points that indicate sound in decibels that a hypothetical user hears for a given range of frequencies. FIG. 2b shows an equalized graph 110 with a changed curved line with respect to the original reference points in FIG. 2a after the decibel levels have been altered to improve or correct for the decibels heard by the user. Even small changes can make a noticeable difference and make music sound more clear and thus better heard by the user. It can also affect other characteristics of music as discussed herein.

Further exemplary AI processes may use other known techniques, such as compression, for reducing the volume of loud sounds or amplifying quiet sounds.

FIGS. 3-10 provide various conceptual illustrations of exemplary implementations of the system for providing a custom listening experience and will each be discussed in turn.

Figure 3:
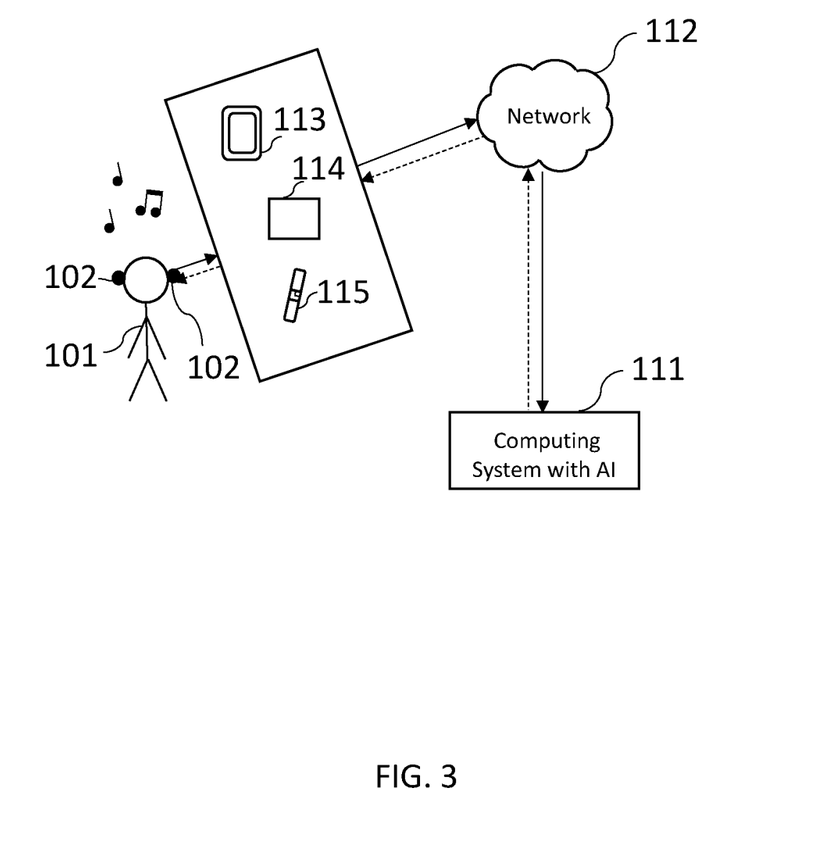
FIG. 3 illustrates a smart listening experience that includes a computing device in communication with a computing system with AI.

FIG. 3 illustrates a user 101 wearing a pair of earbuds 102 and having a custom listening experience. The earbuds are connected through an electronic device, as represented by exemplary mobile phone 113, laptop 114, and smart watch 115, which is connected over the network 112 to a computing system with AI 111. Data from the earbuds and/or electronic device is collected by the electronic device and sent through the network 112 to the computing system with AI 111, as indicated by solid arrows. The computing system with AI 111 receives the data and applies an artificial intelligence algorithm to the data to generate a customization rule that can then be applied to generate customization data. The customization data is then sent over the network 112, through the electronic device and received by the earbuds 102 to present a custom listening experience to the user 101.

The data received by the computing system with AI 111 may include user-defined preferences, such as preferred or active settings (e.g. volume, speed, left/right balance, equalization settings, etc.), playlists, history of music played, current music being played, physiological response of a user (touch control, voice activation, head movement, etc.), data from multiple users, external information (voice, background noise, wind, etc.), time of day, etc. Other types of data are also anticipated. The system recognizes user behavior in association with, for example, genres of music, music artists, sources of music streaming, etc. The system further associates with all kinds of other programs and apps, including Apple Music®, iTunes®, Sound Cloud®, Spotify®, Pandora®, iHeart Radio®, YouTube®, Sound Hand®, Shazaam®, Vimeo®, Vevo®, etc. For example, other apps will be able to receive a customized listening experience that can be shared, commented on, liked, and used for other generally known purposes.

Figure 4:
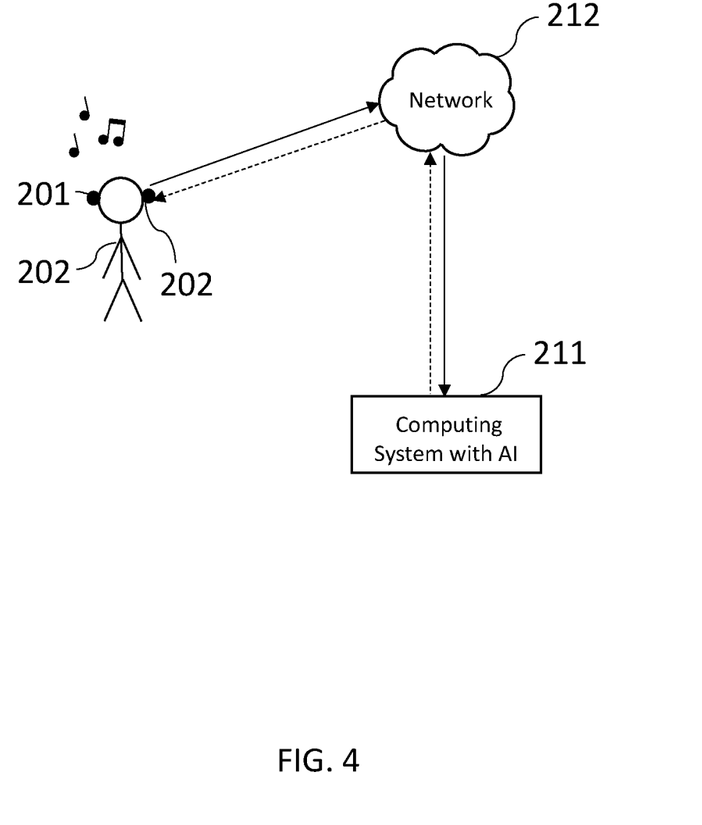
FIG. 4 illustrates a pair of earbuds in communication with a computing system with AI.

FIG. 4 illustrates a user 201 that is using earbuds 202 that connect directly over the network 212 to the computing system with AI 211. The connection can be any wireless connection, such as Bluetooth, WiFi, or other known wireless connection. In this example, the controls and data are located on the earbuds 202 themselves rather than a separate device. Data is sent automatically over the network, however, the data being sent may be controlled by user preferences or by manual control.

Figure 5:
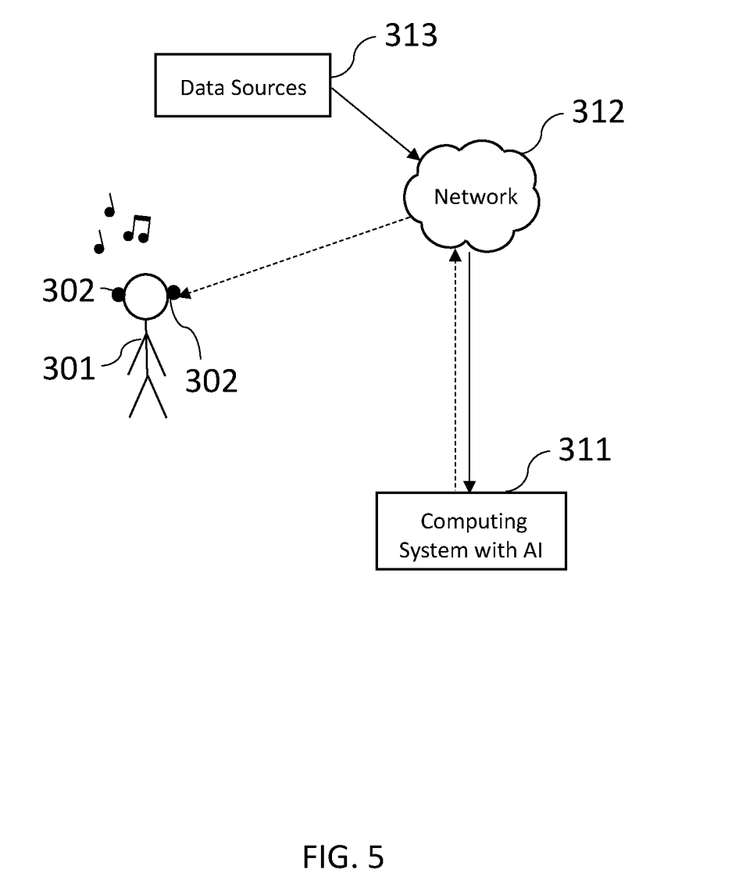
FIG. 5 illustrates data sources that are available to a computing system with AI.

FIG. 5 illustrates the same system as shown in FIG. 3 but with the computing system with AI 511 having access to external data sources 313. The external data sources 313 provide, for example, listening patterns, music playlists, top chart songs, ranked songs, songs by genre, song data analytics, song characteristics, requested or standard equalization settings for songs, etc. The data sources are useful in providing information in which the computing system with AI 311 can use to generate customization rules for a base song or set of songs.

Figure 6:
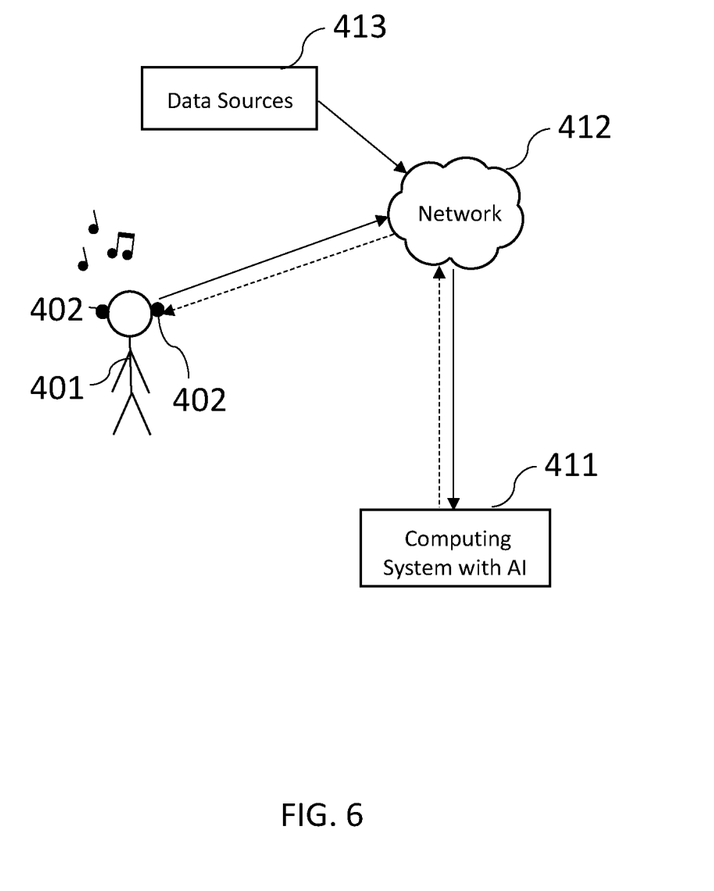
FIG. 6 illustrates data being sent from both earbuds and data sources to a computing system with AI.

FIG. 6 illustrates the same system as shown in FIG. 4 but with the computing system with AI 411 having access to external data sources 413. The external data sources 413 provide, for example, listening patterns, music playlists, top chart songs, ranked songs, songs by genre, song data analytics, song characteristics, requested or standard equalization settings for songs, etc. The data sources are useful in providing information that the computing system with AI 411 can use to generate customization rules for a base song or set of songs.

Figure 7:
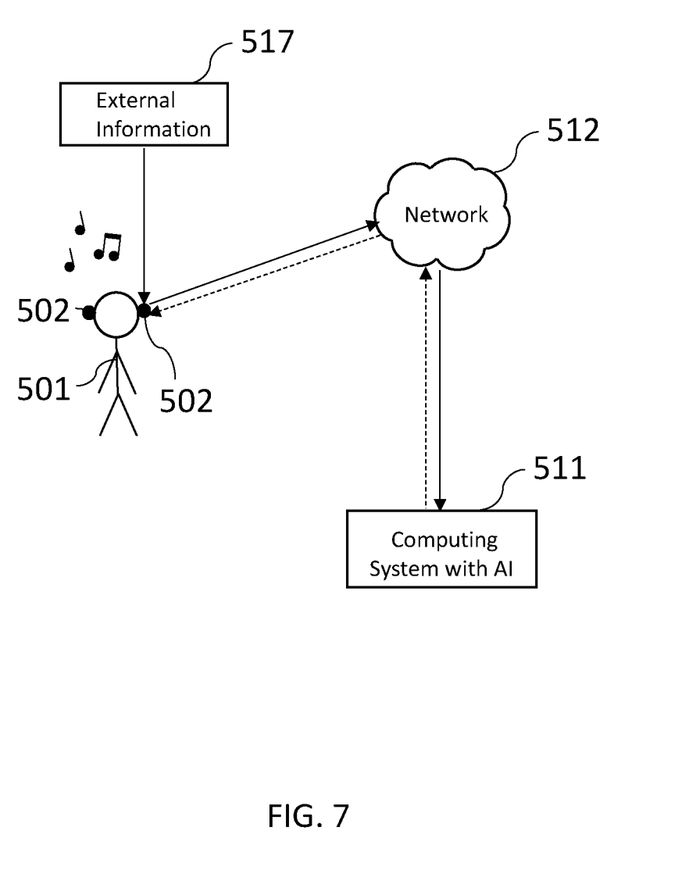
FIG. 7 illustrates external information being sent to earbuds in relation to a computing system with AI.

FIG. 7 illustrates the system having external information 517 being available to earbuds 502 of a user 501. The external information 517 may include ambient noise, human movement, environment conditions (e.g., rain, wind, temperature, etc.), and other information that can be processed by the earbuds and/or sent over the network 512 to the computing system with AI 511.

Figure 8:
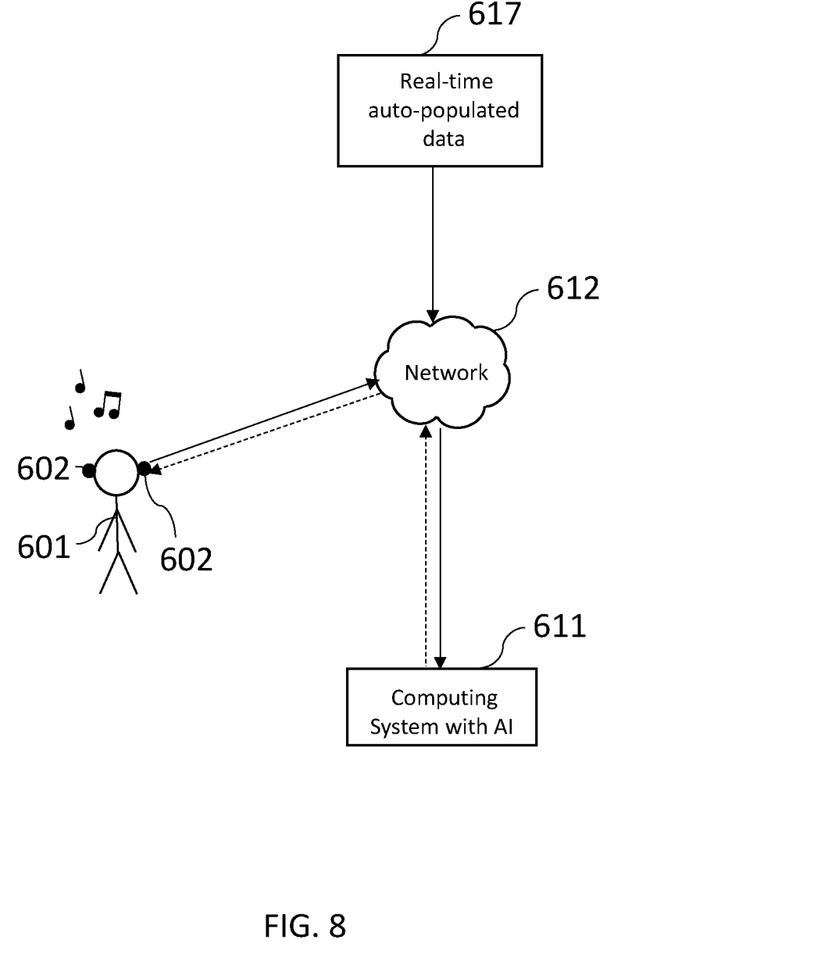
FIG. 8 illustrates real-time auto-populated data being made available to a computing system with AI.

FIG. 8 illustrates the system having real-time auto-populated data 617 being available over the network 612 to the computing system with AI 611. The data 617 includes all types of dynamic data that can be updated in real-time and be raw or have pre-processing before being sent to the computing system with AI. The data 617 enables the computing system with AI 611 to have up-to-date information so that the rules applied to a listening experience are as advanced as they can be. The system uses the data to not only generate new custom rules, but it further allows the system to update previously generated custom rules.

Figure 9:
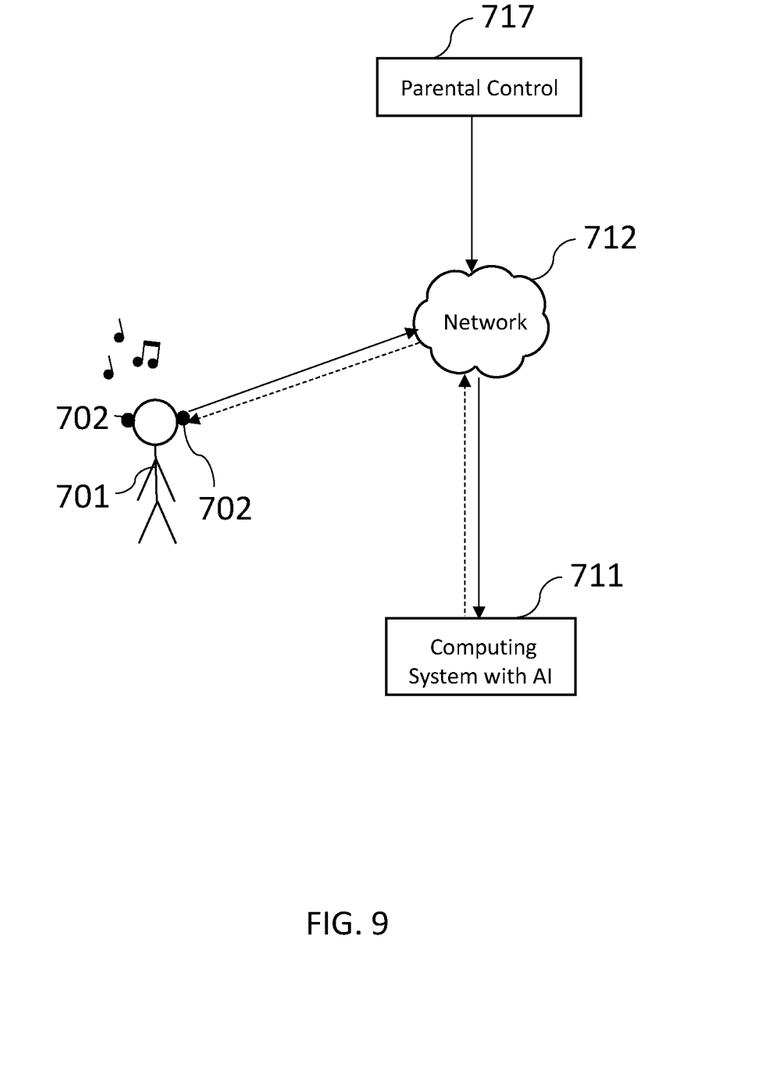
FIG. 9 illustrates parental control features being made available to a computing system with AI.

FIG. 9 illustrates that the system may have parental control 717 over the network 712. Parental control 717 may be applied by the computing system with AI 711. Examples of parental control can include a plethora of rights, such as control over times allowed for listening, restrictions on profanity, earbud location finding tools, volume and other sound characteristic controls, etc. The computing system with AI 711 generates custom rules that incorporate the parent control rights 717 and sends them to the earbuds 702 of the user 701 over the network 712. Note that the parental control 717 may also incorporate data sent over the network by the earbuds 702 to generate custom rules.

Similarly, the user may have a personal filter for profane language, vulgarity, explicit words and lyrics. This feature allows the user to either manually block a choice of words or have the system automatically recognize obscene language. The feature then responds by giving the user a music playback/streaming experience that is free from the use of this type of language. AI can auto cutout certain explicit words and lyrics by preference of user. In another example, the app can automatically adjust by AI depending on user actions.

Figure 10:
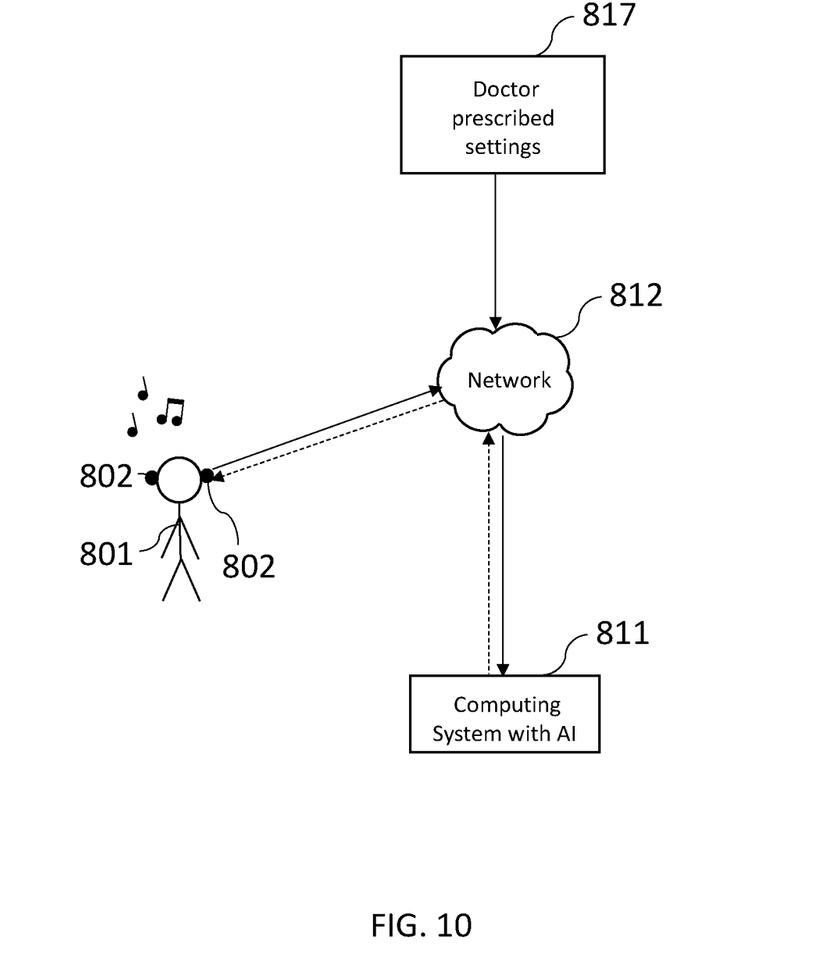
FIG. 10 illustrates doctor-prescribed settings being made available to a computing system with AI.

FIG. 10 illustrates the system having doctor-prescribed settings 817 being made available over the network 812 to the computing system with AI 811. Doctor prescribed settings may be used to limit music in a manner that prevents hearing loss by controlling characteristics of music as described herein.

Figure 11:
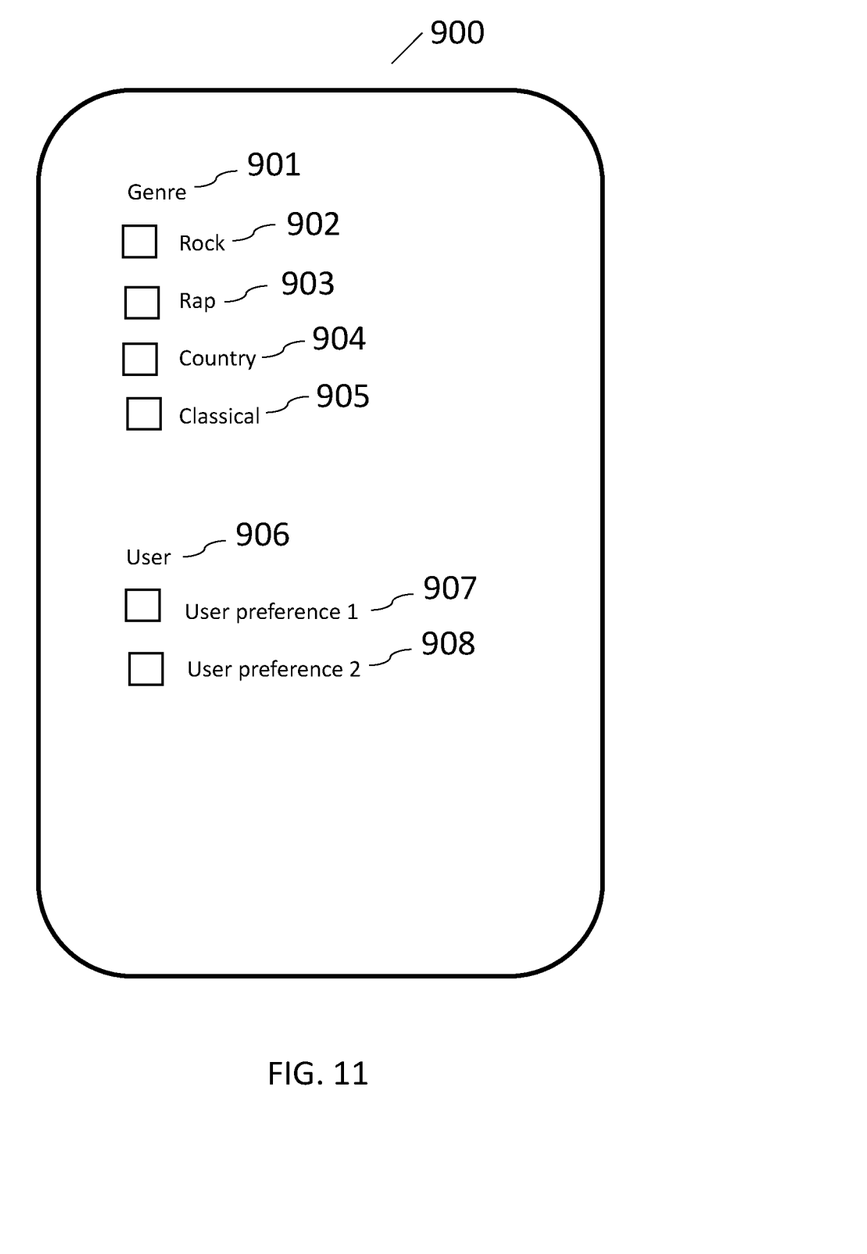
FIG. 11 illustrates an exemplary user interface with user-defined selections that are then used to control features of a smart listening experience.

For aspects of the system that are controlled via a touch screen user interface, an exemplary interface 900 is shown in FIG. 11. A user interface provides selections that may be controlled, such as the selection of a particular genre 901 with options such as rock 902, rap 903, country 904, and classical 905. The type of genre selected may be used by the system to suggest further music (specific songs, playlists, etc.) of that type of genre that the user may enjoy. Alternatively, the type of genre selected may be used to modify music that the user selects into being more like that type of genre in terms of musical characteristics described herein. The type of genre may be used to generate other custom rules as well.

The user may opt to have more than one user profile 906 as denoted by first user preference 907 and second user preference 908, based on which the system may generate custom rules. For example, a parent and a child may each have their own user profile. The custom rules are then tailored to the specific listening experiences, desires, and settings for each user rather than combining them into a jumbled customized rule set.

Figure 12:
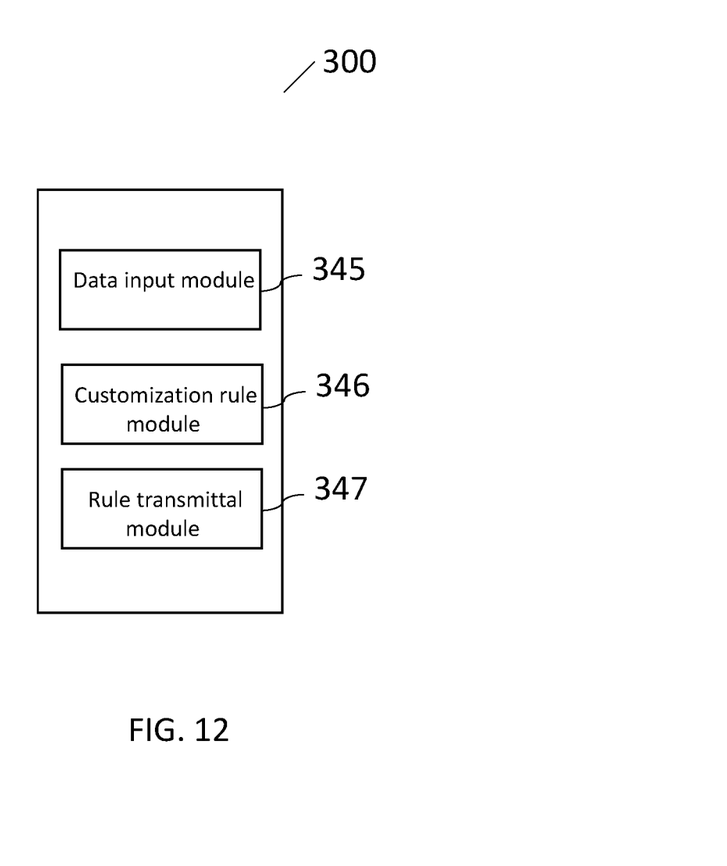
FIG. 12 illustrates a system with modules that implement various features and aspects of a smart listening experience.

Various modules may be used to implement the system discussed herein. Turning to FIG. 12, an exemplary audio customization system comprises a data input module 345 that includes a computing device and computer-readable instructions to direct the computing device to receive customization data and provide customization to a customization rule module 346. The customization rule module 346 includes a computing device and computer readable instructions that direct the computing device to apply an artificial intelligence algorithm to the customization data to thereby generate a customization rule set based on the customization data.

The data input module 345 includes customization data, which may include at least one or more of user-defined preferences; user listening patterns; data sources; external information; real-time auto-populated data; parental control settings; a physiological response of a user; equalization data; and doctor prescribed settings. Exemplary equalization data is based on a sound test on a user. The customization rule set comprises at least one customization rule.

In one example, the customization data comprises a user tone map. The user tone map comprises a tone deficiency; and the customization rule set comprises a rule to compensate for the tone deficiency by amplifying an associated tone.

In another example, the customization data comprises a song set comprising at least one song. The system applies an artificial intelligence algorithm that includes mapping a note from the song to a plurality of measurable tonal qualities. The resulting customization rule set is based at least in part on the plurality of measurable tonal qualities.

In another example, the customization data comprises a song set comprising at least one song. The system applies the artificial intelligence algorithm to determine at least one sound characteristic of the song set. The customization rule set is based at least in part on the at least one sound characteristic. The song set may comprise at least two songs where all songs in the song set share a common genre.

Figure 13:
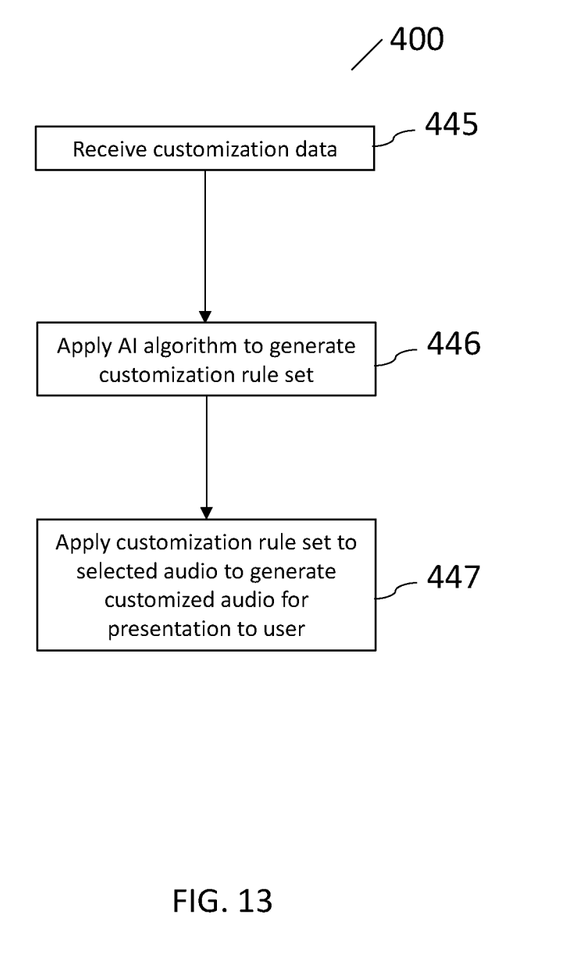
FIG. 13 illustrates a flow chart for implementing aspects of the system.

The method implemented by the system may be described and expanded upon based on the flow chart 400 referenced to in FIG. 13. In step 445, the computer system with AI receives customization data. In step 446, the system applies an artificial intelligence algorithm to the customization data to generate a customization rule set based on the customization data.

The customization data includes, for example, one or more of a user's physiological response metrics, ambient sound, ambient light, currently played music, a user's active choice of music, and a user's active response. The active choice of a user includes conscious music selections and in-time conscious responses. The active choice of a user may include music genre choice and/or volume control during each music being played. Alternatively, the active response of a user may include volume and settings adjustments.

Other examples of active choices may include a selected musical piece; a selected music playlist; a modified frequency profile; a modified tone profile; a modified volume profile; a modified or deleted language content of a musical piece; and selected output from control to another app. The deleted language content may include, for example, the deletion of vulgarity or a translation of language.

In step 447, the system applies the customization rule set to base audio to generate customized audio.

While this invention has been described with reference to certain specific embodiments and examples, it will be recognized by those skilled in the art that many variations are possible without departing from the scope and spirit of this invention, and that the invention, as described by the claims, is intended to cover all changes and modifications of the invention which do not depart from the spirit of the invention.

What is claimed is:

1. A music listening customization system, comprising:
a data input module comprising a computing device and computer-readable instructions that, when executed, cause the data input module to:
receive customization data that includes at least one of equalization data from a sound test by a user and music preference data of the user; and
provide the customization data to a customization rule module; wherein:
the customization rule module comprises a computing device and computer readable instructions that, when executed, cause the customization rule module to:
apply an artificial intelligence algorithm to the customization data to generate a customization rule set based on the customization data, the customization rule set comprising rules that, when applied to music, change at least one of a pitch, frequency, timbre, decibels, equalizer, and other audible musical characteristic to enhance music that is played for the user, wherein the customization data comprises a song set comprising at least one song, applying the artificial intelligence algorithm comprises mapping a note from the at least one song to a plurality of measurable tonal qualities, and the customization rule set is based at least in part on the plurality of measurable tonal qualities.

2. The system of claim 1, wherein the customization data further comprises at least one of the following:
user-defined preferences;
user listening patterns;
data sources;
external information;
real-time auto-populated data;
parental control settings;
a physiological response of a user;
and
doctor prescribed settings.

3. The system of claim 1, wherein the customization rule set comprises at
least one customization rule.

4. The system of claim 3, wherein:
the customization data comprises a user tone map;
the user tone map comprises a tone deficiency; and
the customization rule set comprises a rule to compensate for the tone deficiency by amplifying an associated tone.

5. The system of claim 3, wherein:
the customization data comprises a song set comprising at least one song;
applying the artificial intelligence algorithm comprises determining at least one sound characteristic of the song set; and
the customization rule set is based at least in part on the at least one sound characteristic.

6. The system of claim 5, wherein:
the song set comprises at least two songs; and
all songs in the song set share a common genre.

7. A computer-implemented method for customizing musical output, comprising:
receiving customization data that includes equalization testing data of a user;

applying an artificial intelligence algorithm to the customization data to generate a customization rule set based on the customization data; and using the customization rule to compensate for hearing deficiencies of the user by changing at least one of a pitch, frequency, timbre, and other audible musical characteristic associated with music that is played for the user, wherein the customization data comprises a song set comprising at least one song, applying the artificial intelligence algorithm comprises mapping a note from the at least one song to a plurality of measurable tonal qualities, and the customization rule set is based at least in part on the plurality of measurable tonal qualities.

8. The method of claim 7, wherein the customization data comprises at least one of:
   a user's physiological response metrics;
   ambient sound;
   ambient light;
   currently played music;
   a user's active choice; and
   a user's active response.

9. The method of claim 7, further comprising applying the customization rule set to base audio to generate customized audio.

10. The method of claim 7, wherein the active choice of a user includes conscious music selections and in-time conscious responses.

11. The method of claim 7, wherein the active choice of a user includes music genre choice and volume control from played music.

12. The method of claim 7, wherein the active response of a user includes one or more volume adjustment or and setting adjustment.

13. The method of claim 7, wherein the active choice of a user includes one or more of:
   a selected musical piece;
   a selected music playlist;
   a modified frequency profile;
   a modified tone profile;
   a modified volume profile;
   modified or deleted language content of a musical piece; and
   selected output from control to another app.

14. The method of claim 7, wherein the modified or deleted language content comprises deletion of vulgarity or a translation.

15. The method of claim 7, further comprising using the customization rule for left-right balance, compression, noise cancellation, and volume control based on external information.

16. A music listening customization system, comprising:
   a data input module comprising a computing device and computer-readable instructions that, when executed, cause the data input module to:
   receive customization data that includes music preference data based on at least one user-defined preference, collected data of the user, and an external data source; and
   provide the customization data to a customization rule module; wherein:
   the customization rule module comprises a computing device and computer readable instructions that, when executed, cause the customization rule module to:
   apply an artificial intelligence algorithm to the customization data to generate a customization rule set based on the customization data, the customization rule comprising rules that, when applied to music, change at least one of a pitch, frequency, timbre, decibels, equalizer, and other musical characteristic to enhance music that is played for the user, the customization data comprising a song set comprising at least one song, applying the artificial intelligence algorithm comprises mapping a note from the at least one song to a plurality of measurable tonal qualities, and the customization rule set is based at least in part on the plurality of measurable tonal qualities.

17. The system of claim 16, wherein the collected data includes at least one of previous user control, preferred music type, volume control, and listening habits.

18. The system of claim 16, wherein:
   the external data source includes at least one of a listening pattern, music playlist, top chart songs, ranked songs, songs by genre, song data analytics, song characteristics, requested equalization settings, and standard equalization settings; and
   the customization rule set comprises a rule to modify music to have a musical characteristic associated from the external data source.

* * * * *